(12) United States Patent
Rochelle

(10) Patent No.: US 10,479,705 B2
(45) Date of Patent: Nov. 19, 2019

(54) ILLUMINATED VENTILATION RING FOR A UV-LIGHT WATER SANITIZER

(71) Applicant: Custom Molded Products, LLC, Newnan, GA (US)

(72) Inventor: Gary P. Rochelle, Marina del Ray, CA (US)

(73) Assignee: Custom Molded Products, LLC, Newnan, GA (US)

( * ) Notice: Subject to any disclaimer, the term of this patent is extended or adjusted under 35 U.S.C. 154(b) by 0 days.

(21) Appl. No.: 15/797,370

(22) Filed: Oct. 30, 2017

(65) Prior Publication Data

US 2018/0162748 A1   Jun. 14, 2018

Related U.S. Application Data

(60) Provisional application No. 62/416,156, filed on Nov. 1, 2016.

(51) Int. Cl.
*C02F 1/32*   (2006.01)
*C02F 1/78*   (2006.01)
*C02F 103/42*   (2006.01)

(52) U.S. Cl.
CPC ............... *C02F 1/32* (2013.01); *C02F 1/325* (2013.01); *C02F 1/78* (2013.01); *C02F 2103/42* (2013.01); *C02F 2201/32* (2013.01); *C02F 2201/3223* (2013.01); *C02F 2201/3226* (2013.01)

(58) Field of Classification Search
CPC .......... C02F 1/32; C02F 1/78; C02F 2103/42; C02F 2201/3226
USPC .... 250/453.11, 454.11, 455.11, 493.1, 504 R
See application file for complete search history.

(56) References Cited

U.S. PATENT DOCUMENTS

2008/0095661 A1* 4/2008 Kohler ..................... A61L 9/20
422/20

* cited by examiner

*Primary Examiner* — Nicole M Ippolito
(74) *Attorney, Agent, or Firm* — Laurence P. Colton; Smith Tempel Blaha LLC

(57) ABSTRACT

A ventilation ring for a UV water sanitizer unit that allows for adequate ventilation of heat generated by electronic components while sequestering those electronic components from water. The ring can also be made of a transparent or translucent material to allow a user to detect whether a UV lamp within the housing is operating. An improved nut for affixing a quartz tube within such a unit and improved design for draining the unit are also disclosed.

18 Claims, 5 Drawing Sheets

ILLUMINATED VENTILATION RING FOR A UV-LIGHT WATER SANITIZER

STATEMENT OF RELATED APPLICATIONS

This patent application claims priority on and the benefit of U.S. Provisional Patent Application No. 62/416,156 having a filing date of 1 Nov. 2016.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records, but otherwise reserves all copyright rights whatsoever.

BACKGROUND OF THE INVENTION

Technical Field

This invention relates to water sanitation treatment devices and more particularly to a method and apparatus for treating pool, spa or other bodies of water with UV light.

Prior Art

UV-light germicidal water treatment sanitization apparatus units are commonly used on swimming pools, spas and other reservoirs of water to control bacteria and lower dependence on traditional chemicals such as chlorine to sanitize water. Water is pumped through a tank in these devices where it is exposed to UV light generated by UV lamps to sanitize the water. An example of these UV lamps are bulbs that emit UV-C light of about 254 nm within the UV water treatment tank or container to expose water to the light to sanitize it.

UV lamps require an electronic ballast to power them and perhaps other electronics too. A problem with ballasts is that they can generate a substantial amount of heat that can damage the apparatus and, because these units are often situated outdoors, the ballast and electronics must be protected from outdoor moisture too. Two types of designs are typically used to protect these units from moisture and heat but they are problematic. A first common solution is a design that connects the ballast inline on a power supply cord, so the ballast is located in a separate housing that is external to a UV lamp and water tank housing. There are various disadvantages to locating the ballast in an inline external housing however, so a second more common design includes the ballast and electronics placed together with the other components in a unitary but compartmentalized housing, usually with placing the ballast in a compartment located on top, above the UV lamp and water tank.

While a compartmentalized housing design like this is more economical and convenient, it introduces thermal problems due to the heat generated both by the ballast within the tight space of the single housing. The thermal issues are further exacerbated because the ballast space must be sealed to prevent moisture intrusion from rain, irrigation, etc. from entering or collecting in the electrical components compartment area of the housing, where the moisture might damage the electrical components.

To avoid the thermal problems of enclosing a ballast together with other electrical components in a compartment of a single housing then, it would be ideal to introduce adequate ventilation into the area of the housing containing the ballast. Adequate ventilation is difficult to achieve however because it could expose the electrical components to damage from the intrusion of moisture.

A second problem with existing UV-light water sanitization devices is the difficulty of being able to observe whether their UV lamps are functioning. Translucent or clear windows in the wall of a housing have been used in the past to observe the lamp but, because any window is an interruption in the wall of a housing and a window must usually be placed where the UV light is emitted, on or adjacent to the water tank, such designs are prone to leakage and failure. These parts must be bonded together, for instance with glue, and the bonded joints are weaker and may fail. Incorporating a windows of a band of translucent or clear material built into the wall of a water chamber itself for this purpose is also prone to failure because the water is under perhaps 20-30 psi of water pressure during operation.

There is also a problem in the prior art with maintenance of these UV-light water sanitization devices. The designs of many of them place a transparent quartz tube immersed in the water of the water chamber that is held in place by a mounting nut, this creates a tube having a dry space within it in which to place a UV lamp. The mounting nut might also serve to mount the UV lamp itself that is inserted into the quartz tube. The problem arises because the UV lamps and their quartz tubes may need to be removed to be cleaned and most designs of the prior art require that the mounting nuts used to hold the quartz tube and or the UV lamp be disassembled in the process. The mounting nut typically includes one or more water-tight sealing O-rings and other sub-parts, so the process of disassembling these components can damage the UV lamp, the quartz tube as well as the mounting nut itself and O-rings seals. What is needed is a more robust design that can circumvent the problem of removing these parts for maintenance.

Yet another maintenance problem with such devices of the prior art is in fully draining the water from the water chamber or tank. This usually requires the disconnection and removal of the water chamber to fully drain it or, with other designs, the use of a drain plug that may not fully empty the water at the bottom of the chamber completely.

What is needed then is a design for a UV-light water sanitization apparatus that includes compartment within a unitary housing containing heat-generating electronics is adequate ventilation to allow heat to exhaust but without exposing the electronics to excessive moisture. What is also needed is a design that allows a user to more easily observe whether the UV lamp of the unit is functioning without compromising the structural integrity of the water tank. What is also needed is a design that allows for easier maintenance, where the UV lamps and quartz tubes can be more easily removed and reassembled, and, optimally, a design that allows the water contained in the tank of a unit to be more completely drained.

BRIEF SUMMARY OF THE INVENTION

A solution to the various problems with UV-light water sanitizer units has been devised, with the different problems recited above resolved by different aspects of the design of the present invention.

The present invention includes a ventilation ring incorporated into the housing of a UV-light sanitization apparatus that is designed and located in such a way as to allow heated air to exhaust from an electrical compartment located in a bonnet placed atop the water tank housing, while still preventing the intrusion of moisture into the bonnet to protect the electronics. The ventilation ring is mounted on top of the body housing of the water tank part of the unit and has a flange or flanges projecting to a greater diameter than that of the tank housing and having ventilation openings or holes in the flange or flanges. A bonnet housing electrical components such as the ballast and having an internal perimeter slightly larger than the flange or flanges is adapted to fit over the ventilation ring like a hat. The openings in the ventilation ring flange or flanges allow heat generated within the bonnet to escape downwardly from the bonnet while preventing moisture from rain or spray from entering the bonnet from the top or side of the unit.

In another embodiment of the present invention the ventilation ring is made from a clear or translucent material, such as ABS plastic to create a window between the tank housing and the bonnet, allowing a user to see whether a UV lamp is working. A quartz tube holding a UV lamp is generally held in place with a mounting nut that might occlude the passage of light from the UV lamp, so in the preferred embodiment this clear ventilation ring is used in conjunction with a mounting nut made of transparent or translucent material or by appropriately-placing a UV lamp to allow more light to escape into the bonnet area, or both, thereby better illuminating the clear or translucent ventilation ring to allow a user to better see the glow of a UV lamp though the ventilation ring, to determine whether the UV lamp is functioning.

Another aspect of the present design permanently affixes the quartz tube to a mounting nut, reducing the likelihood of damage to component parts of a mounting nut such as compression washers and O-rings, but instead with uses of adhesive to create a permanent and water-tight bond between a quartz tube and a mounting nut. When used with the translucent ventilation ring described above, it is preferred that the mounting nut also be made of a transparent or translucent material such as ABS plastic to transmit more UV light to be transmitted to the ventilation ring for greater illumination to check that the UV lamp is functioning.

Yet another aspect of the present invention is a water container tank having a hemispheric-shaped end with a drain plug placed at substantially the lowest point of the hemispherical end of the tank being drained, for more complete drainage of water from the tank.

DESCRIPTION OF THE INVENTION AND PREFERRED EMBODIMENT

The following description, and the figures to which it refers, are provided for the purpose of describing examples and specific embodiments of the invention only and are not intended to exhaustively describe all possible examples and embodiments of the invention.

Figure 1:
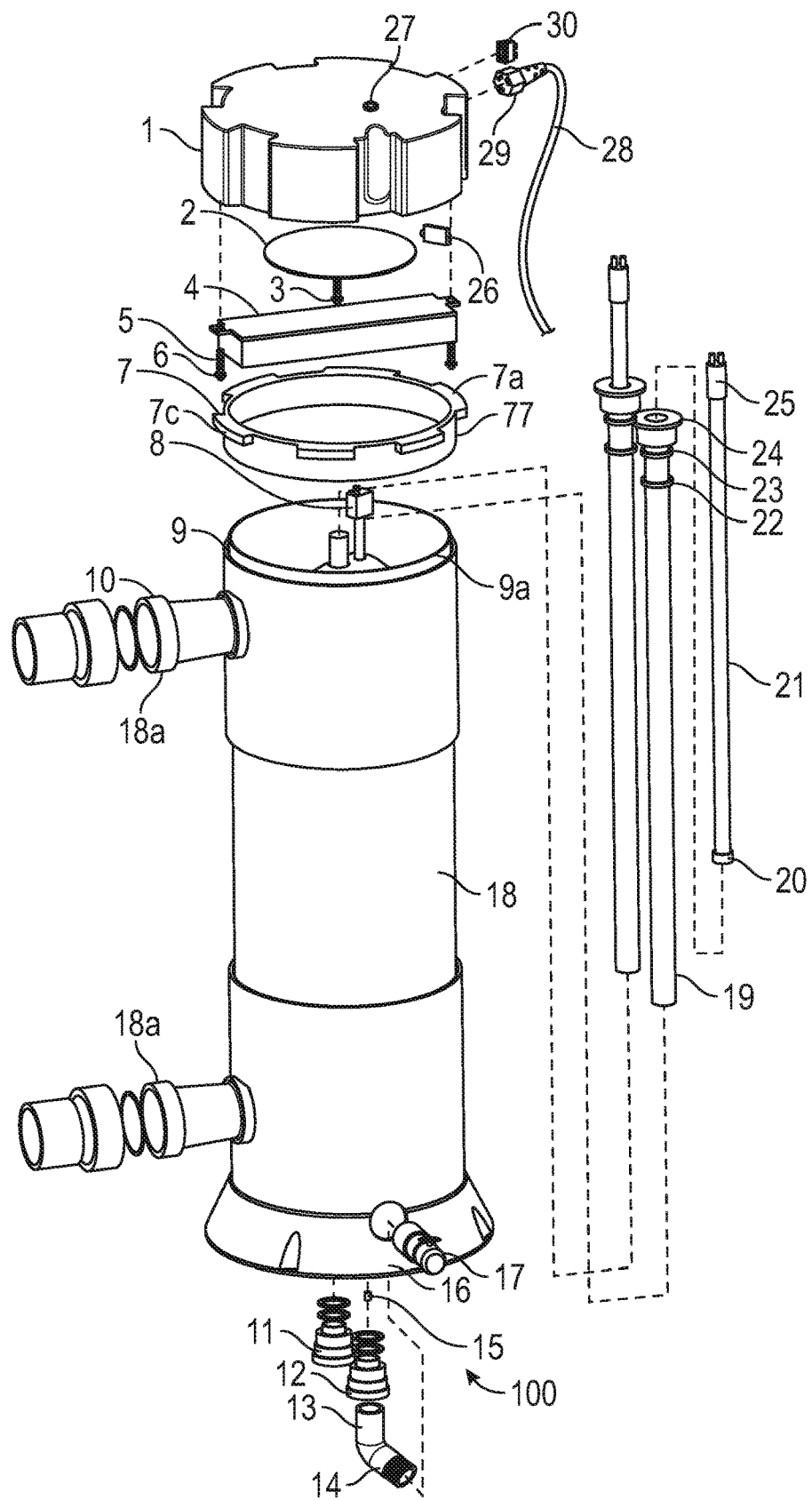
FIG. 1 is an exploded view of the UV-light water sanitizer of the present invention.
Figure 2A:
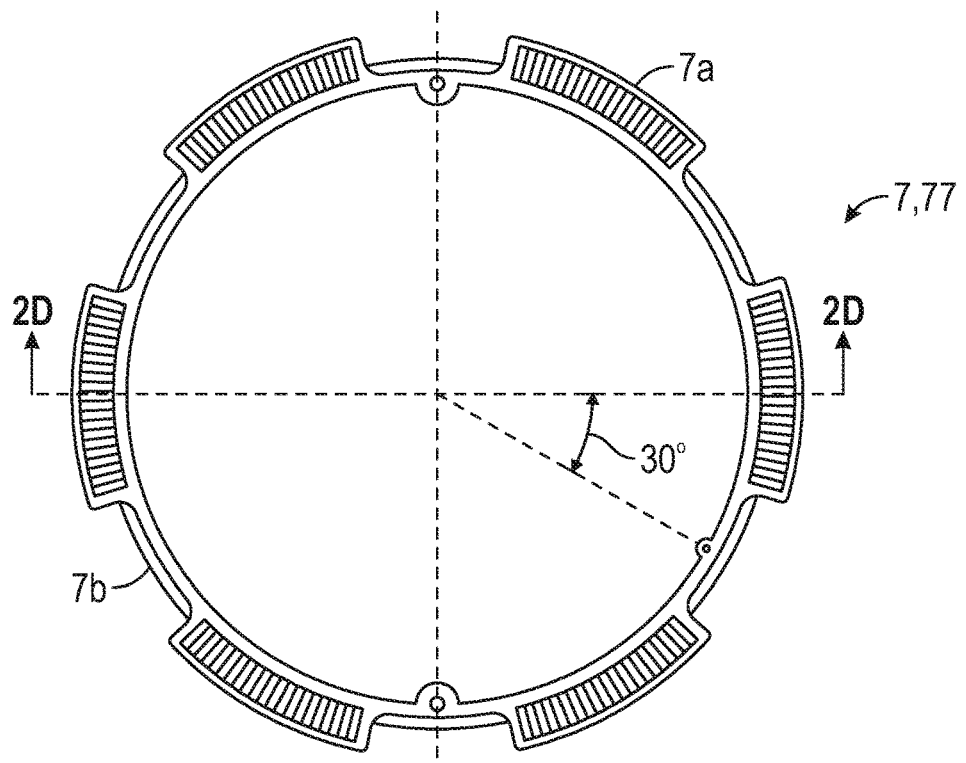
FIG. 2A is a top view of the ventilation ring of the present invention.
Figure 2B:
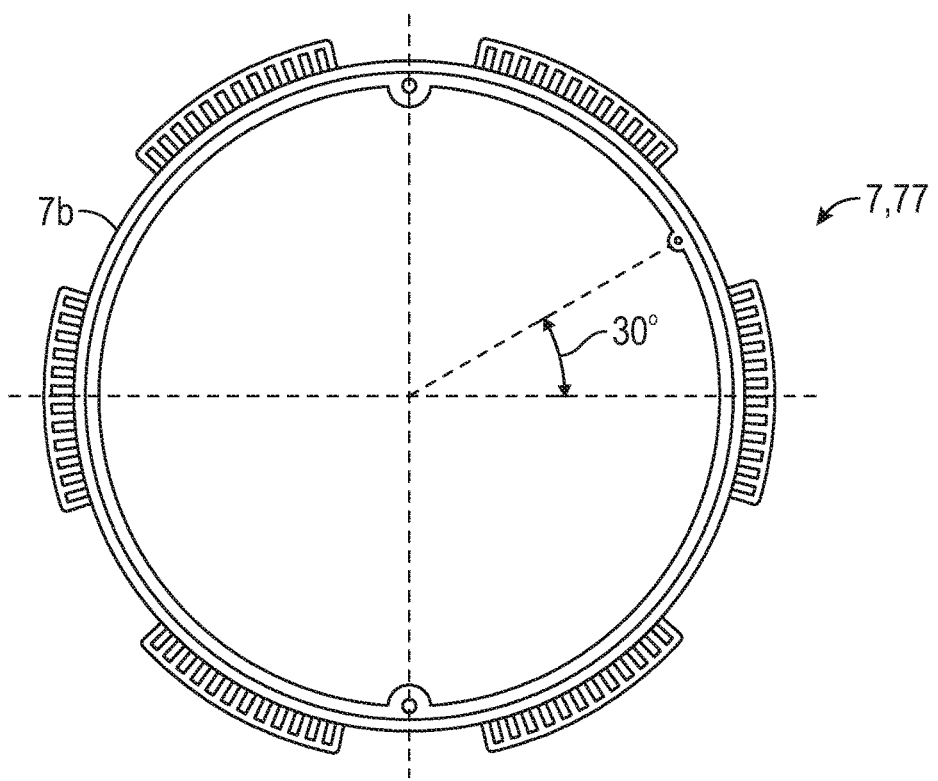
FIG. 2B is a bottom view of the ventilation ring of FIG. 2A.
Figure 2C:
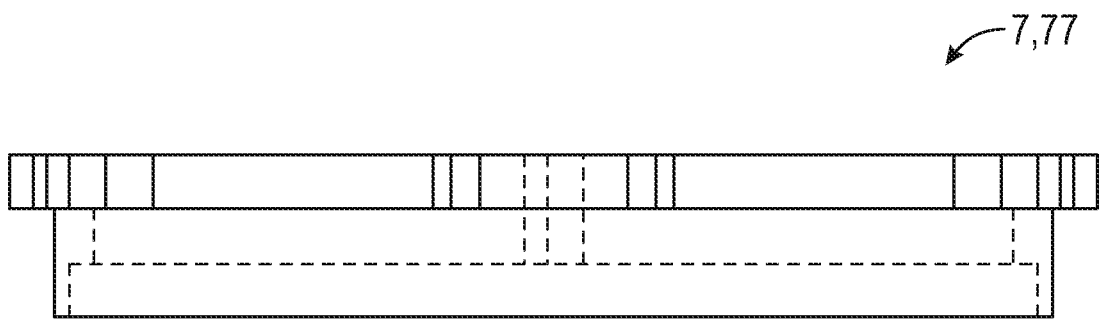
FIG. 2C is a sectional side view of the ventilation ring of FIG. 2A.
Figure 2D:
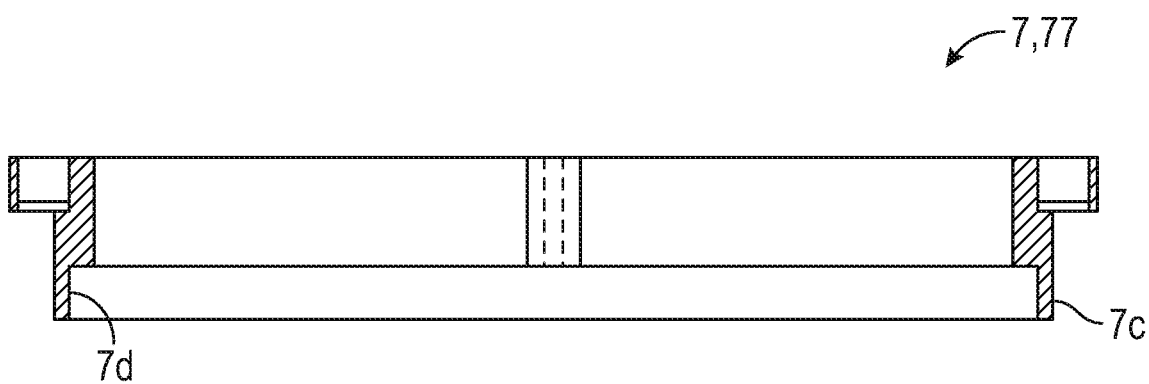
FIG. 2D is a sectional side view of the ventilation ring of FIG. 2A.

Referring to FIG. 1, a UV-light water sanitizer unit 100 of the present invention is shown. The unit includes a body tube 18 that is a water container or tank that can be generally cylindrical in shape as shown in this illustration. The body tube 18 further includes two ports 18a for use as water inlet and outlet for injecting water into the body tube, the other for exhausting water from the body tube. The body tube 18 is mounted on a mounting base 16 that rests on a surface and the upper end is capped with a body end cap 9.

An electronic ballast 4, and perhaps other electronics are isolated from ambient moisture and the water in the tank 18 by being situated above the body end cap 9 contained within a bonnet or housing cover 1, acting as an electrical compartment for the UV-Light water sanitizer apparatus 100. A ventilation ring 7 is affixed, preferably with glue, to a body end cap 9 mounted atop the body tube 18, with a shoulder 9a cut formed in the body end cap 9 to receive the ventilation ring 7. The bonnet 1 containing the electrical components, forming a compartment, is adapted to fit over the ventilation ring 7, having a corresponding shape and dimensions of slightly greater diameter than the upper body end cap 9 mounted atop the body tube 18 that rests over and exterior to the ventilation ring 7. The ventilation ring 7 then is effectively an adapter sized to receive and fit within the perimeter of the internal wall of the bonnet 1 and also fit over the smaller-diameter body end cap 9. In this configuration one or more flanges 7a of the ventilation ring 7 overhang the body end cap 9 to fill a gap between the diameters of the body end cap and the bonnet 1. The ventilation ring includes openings 7b that allow heat generated by the electronic components, such as the ballast, to exhaust.

In the preferred embodiment, a head shield disk 2 is provided to shield the bonnet 1 from direct heat from the ballast 4. The heat shield disk 2 is preferably used, placed over the ballast 4 to protect the plastic of the bonnet 1 from the heat generated by the electronic ballast. UV water sanitizers of the prior art commonly suffer from softened or melted plastic components near the hot ballast where heat is concentrated and air circulation is poor. The current design uses a metallic heat shield disk 2 mounted directly adjacent a ballast 4 to shield a plastic bonnet 1 or cover from heat and additionally serves to conduct heat to the outer areas of the bonnet where it can be more easily dissipated by the vents described earlier. The heat shield disk 2 can also be used to conveniently support electrical wires and connectors too, to help keep them away from moisture sources.

Further referring now to FIGS. 2A-2D, schematic diagrams of the ventilation ring 7 of the preferred embodiment are shown. The illustrative implementation of the ventilation ring 7 incorporates six flanges 7a equally disposed about the outer perimeter of the ventilation ring collar 7c creating sizable openings 7b, openings that act as vents sufficient to allow adequate air exchange between the external ambient air and the electrical compartment.

In the preferred embodiment, six flanges 7a are used but other configurations of flanges may be used, any of which have openings 7b in the ventilation ring flanges to allow for air exchange.

The bonnet 1 is then installed over the ventilation ring 7 adapted to be affixed to both the bonnet and the body end cap 9, such that the vents are facing downwardly and thereby are completely shielded from rain or other sources of overhead moisture. Moisture from below may enter through the vents but will also exit through them without collecting near electrical components.

It should be noted that the ventilation ring does not necessarily have to be a round shape, with the round cross-section of the body end cap shown for illustration, they could be of many cross-sectional shapes, square, triangular, oval, etc. as long as the ventilation ring is adapted affix a bonnet of greater diameter over a body end cap to allow the space for vent openings of a ventilation ring between the two, a ventilation ring being of a shape complementary to both and still perform this same ventilation function. In the presently preferred embodiment a round body end cap 9 is formed with an exterior shoulder 9a at its end to receive a ring-shaped round ventilation ring 7 but this is too is shown for purposes of illustration. An interior shoulder 7d may be formed in the ventilation ring 7 complementary to that of 9a to join the body end cap 9 to the ventilation ring 7. For example a square, rectangular, ovoid or triangular shape may be selected for the body end cap 9, ventilation ring 7 and bonnet 1 as long as they are adapted to fit together in the manner described above. It should also be noted that the ventilation ring shown is shown as a separate piece that is glued to the end cap, but while the ring may be a separate piece as shown it could also be formed as a molded part of either the body end cap 9 or the bonnet 1 itself.

Figure 3A:
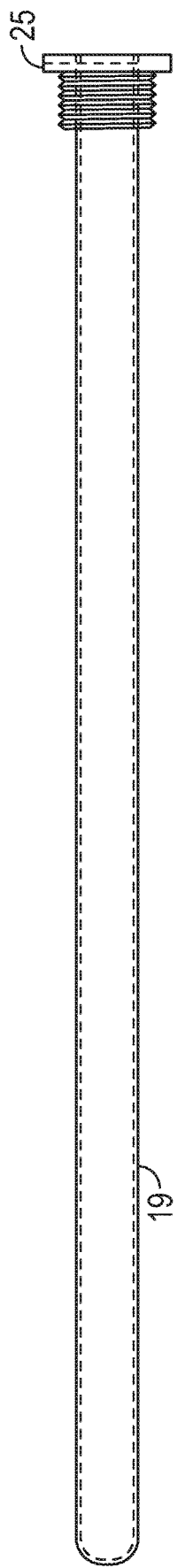
FIG. 3A is a side view another aspect of the present invention, a quartz tube sealing nut.
Figure 3C:
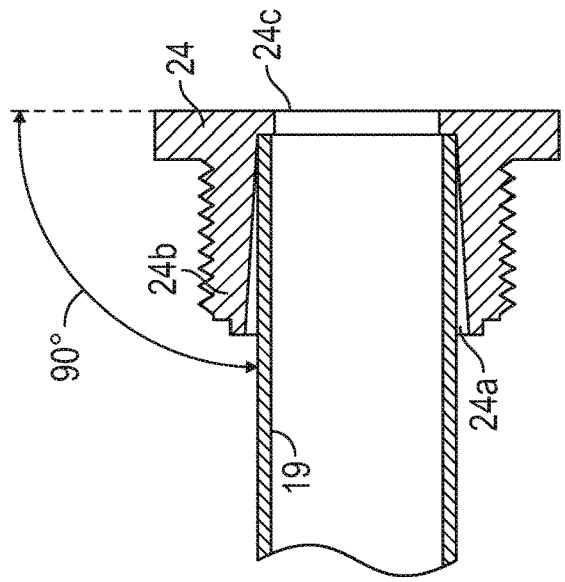
FIG. 3C is a detail side sectional detail view of FIG. 3A.
Figure 3B:
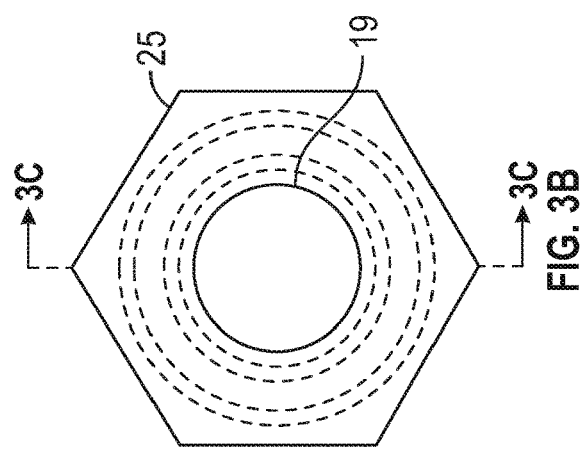
FIG. 3B is a top sectional view of FIG. 3A.

In an alternative embodiment the ventilation ring 7 of the present invention can be made as a ventilation glow ring 77 used to indicate UV lamp operation. A common feature of other UV germicidal water treatment sanitizers is a clear area or window in the wall of the unit that allows for safe viewing of the UV light to confirm operation of UV lamps. These clear areas are commonly incorporated in the center section of the housing, for example in the wall of the body tube 18 in the form of a window, or with clear fittings at the water inlet and outlet ports 18b. These parts are however in direct contact with the pool water and this is a disadvantage because it requires additional parts and pressure-rated glue joints. These parts can also get discolored over time due to direct UV and chlorine exposure in the water. The ventilation ring 7 described above can be made from a clear material, such as ABS or other plastic, to create a glow ring 77 that allows indirect light from the UV lamp or lamps to glow through the top of the electrical housing for a user to view and confirm the UV lamp is operating. This eliminates the need for additional custom parts such as a window embedded in the wall of the unit 100 and keeps the glow area out of the water flow path. The glow ventilation ring is preferably used with a clear sealing nut 25, to allow greater light emitted by a UV lamp 21 to escape through the glow ring 77, as described below and shown in FIG. 3b as 25, made from similar material as that of the glow ring.

FIGS. 3A-3D illustrate yet another aspect of the present invention. Generally, in the prior art when a quartz tube 19 is placed through a body end plug port 18c to extend into the body tube 18 and rest in a cup (not shown) within the lower end of the body tube 18, but in this illustrative embodiment shown here as corresponding to a complementary body tube plug ports 18c shown in FIG. 4. The quartz tubes then are immersed in the water being treated in the body tube 18 by a UV lamp 21 that placed within the quartz tube and sequestered from the water. In the prior art, a cap or sealing nut 24 is installed over the top of the quartz tube with a combination of O-rings and gaskets to provide a watertight seal against the water in the body tube 18. This commonly uses a compression washer and O-ring to retain the quartz tube and they can get brittle and fail. On occasion the quartz tube may need to be removed and disassembled for cleaning and this may cause a user to break the compression washer, O-ring or even the quartz tube itself in the process. The current design permanently affixes a quartz tube 19 into a quartz tube sealing nut 24 cap with an appropriate adhesive 24a instead in the area between the quartz tube and a tapered area on the interior of the sealing nut 24b, eliminating the need to dissemble an assembly. A UV lamp 21 is placed within the quartz tube. When used with the glow ring 77 described above, the sealing nut 25 is made of clear material to allow light generated by the lamp 21 to pass through it and thence to the clear glow ring 77, allowing a user to see whether the UV lamp is functioning.

In the illustration, the quartz tube 19 fits within the sealing nut resting in a shoulder 24c that acts as a stop then appropriate adhesive 24a is provided to fill the area between the quartz tube and the interior of the sealing nut. The presently preferred adhesive is an epoxy resin such as 3M® Resin 9 inserted into a plastic sealing nut 24 or 25. This eliminates the need for additional seals and simplifies service since the quartz pulls out with its sealing nut. The use of an adhesive 24a also allows for an alternative embodiment, a sealing slip nut 24d that lacks a shoulder 24c or other stop allowing sealing slip nut to be placed along the body of the quartz tube 19 rather than just at the top end and affixed in place with the adhesive 24a. This may be useful to allow some UV light to escape into the bonnet 1 area to provide light to reach a transparent or translucent of the ventilation ring 7, a glow ring 77.

Figure 4:
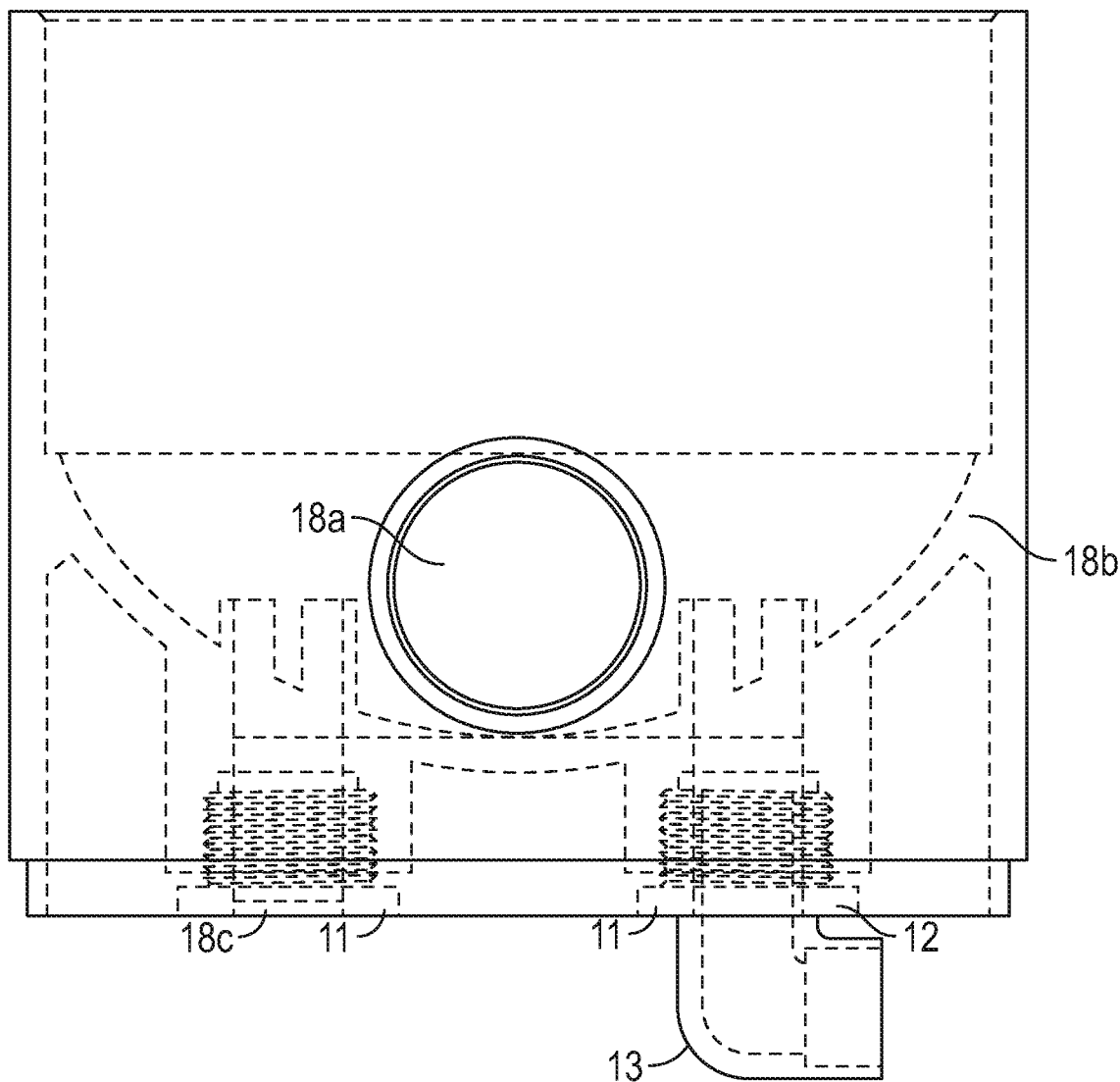
FIG. 4 is a side sectional detail view of another aspect of the present invention, a drain valve

Yet another aspect of the present invention is shown in FIG. 4. The unit includes a body tube 18 that is a water container or tank that is generally a cylinder having an end that is preferably hemispherical in shape (shown in in FIG. 4) for use with a drain plug at the lower end, but both upper and lower ends of the cylinder may be hemispherical even mirror images of each other. There are one or more threaded plug ports 18c that are openings at each end of the body tube 18. The plug ports 18c can be used to either insert a quartz tube 19 (into which a UV lamp 21 is placed) on the upper end of the body tube 18, or be removably plugged for use as a drain if used as the lower end of the body tube. As illustrated, two plug ports 18c are provided at each end of the body tube 18 allowing the use of two quartz tubes and one or both of the ports 18c is used as a drain with the other left plugged and unused. The body tube 18 is mounted on a mounting base 16 and capped with a body end cap 9.

Like many pool products, UV body tubes and other components must be completely drained for winterization to avoid damage due to ice formation. Many UV sanitization units of the prior art require that the UV housing be completely disconnected and then tilted or inverted to extract all of the water contained in it. Some designs may include a drain port, but not located to allow complete drainage. Even a properly located drain may leave water behind in low points, cavities or features designed to hold the quartz tubes. The current design uses a drain port implemented by inserting into a lower body tube plug port 18c a drain fitting plug attached to and in liquid communication with a drain fitting adaptor 12 and a street el pipe 13 to have the water drain horizontally from the body tube 18 at the lowest point in the housing. Drainage is regulated with a drain valve 17. The placement of the body tube plug ports 18c at the bottom of the sloped hemispherical walls 18b at the end of the body tube facilitates the complete drainage of the body tube. This combination of features ensures the most complete draining of the UV body tube 18 as is possible.

It will be appreciated that the invention has been described above with reference to certain examples or preferred embodiments as shown in the drawings. Various additions, deletions, changes and alterations may be made to the above-described embodiments and examples without departing from the intended spirit and scope of this invention. Accordingly, it is intended that all such additions, deletions, changes and alterations be included within the scope of any claims in the resulting patent.

What is claimed is:

1. An ultraviolet light sanitation apparatus comprising:
a housing;
a ventilation ring incorporated into the housing for allowing heated air to exhaust from the housing, the ventilation ring comprising downwardly facing ventilation openings whereby the ventilation openings are shielded from sources of overhead moisture while preventing intrusion of moisture from outside of the apparatus into the housing.

2. The ultraviolet sanitation apparatus of claim 1, wherein the ventilation ring is mounted on top of a water tank housing of the apparatus.

3. The ultraviolet sanitation apparatus of claim 2, wherein the tank housing has a diameter and the ventilation ring has at least one flange projecting to a greater diameter than the diameter of the tank housing.

4. The ultraviolet sanitation apparatus of claim 3, wherein the ventilation openings are located in the at least one flange.

5. The ultraviolet sanitation apparatus of claim 4, further comprising a bonnet housing electrical components, the bonnet housing having an internal perimeter slightly larger than the at least one flange.

6. The ultraviolet sanitation apparatus of claim 5, wherein the bonnet is adapted to fit over the ventilation ring.

7. The ultraviolet sanitation apparatus of claim 6, wherein the ventilation openings in the at least one flange of the ventilation ring allow heat generated within the bonnet to escape downwardly from the bonnet while preventing moisture from entering the bonnet from a top or a side of the bonnet.

8. The ultraviolet sanitation apparatus of claim 3, wherein the ventilation ring comprises six of the flanges equally disposed about as outer perimeter of the ventilation ring.

9. The ultraviolet sanitation apparatus of claim 1, wherein the ventilation ring is made from a clear or translucent material to create a window between the water tank housing and the bonnet.

10. The ultraviolet sanitation apparatus of claim 7, wherein the water tank housing comprises a body tube, the body tube comprising a water inlet port and a water outlet port for injecting water into the body tube and for exhausting water from the body tube, respectively.

11. The ultraviolet sanitation apparatus of claim 10, wherein the body tube is mounted on a mounting base that rests on a surface and an upper end of the body tube is capped with a body end cap.

12. The ultraviolet sanitation apparatus of claim 11, wherein the ventilation ring is affixed to the body end cap.

13. The ultraviolet sanitation apparatus of claim 12, further comprising a shoulder cut formed in the body end cap to receive the ventilation ring.

14. The ultraviolet sanitation apparatus of claim 13, further comprising a heat shield disk to shield the bonnet from direct heat from electronic components of the apparatus.

15. The ultraviolet sanitation apparatus of claim 1, wherein the ventilation ring is a ventilation glow ring used to indicate ultraviolet lamp operation.

16. The ultraviolet sanitation apparatus of claim 15, further comprising at least one plug port configured as an opening at an end of the body tube.

17. The ultraviolet sanitation apparatus of claim 16, wherein the at least one plug port is used for the insertion of a quartz tube into which an ultraviolet lamp is placed.

18. The ultraviolet sanitation apparatus of claim 16, wherein the at least one plug port is used as a drain.

* * * * *